United States Patent [19]

Maier

[11] 4,080,093
[45] Mar. 21, 1978

[54] DRILL FOR ELECTRONIC CONDUCTOR PLATES

[75] Inventor: Andreas Maier, Schwendi-Horenhausen, Germany

[73] Assignees: Hartmetallwerkzeugfabrik Andreas Maier KG, Horenhausen; Hawera Probst GmbH & Co., Ravensburg, both of Germany

[21] Appl. No.: 632,864

[22] Filed: Nov. 17, 1975

[30] Foreign Application Priority Data

Nov. 18, 1974 Germany .............................. 2454580

[51] Int. Cl.² ............................................... B23B 51/02
[52] U.S. Cl. .................................... 408/230; 175/394; 408/226
[58] Field of Search ....................... 408/230, 226, 225; 175/394; 76/108 T

[56] References Cited

U.S. PATENT DOCUMENTS

| | | | |
|---|---|---|---|
| 262,588 | 8/1882 | Hartshorn | 408/230 |
| 2,682,792 | 7/1954 | Donnelly | 408/230 |
| 3,778,180 | 12/1973 | Ostrom | 408/226 |
| 3,806,270 | 4/1974 | Tanner et al. | 408/226 X |
| 3,893,353 | 7/1975 | Lahmeyer | 76/108 T |

FOREIGN PATENT DOCUMENTS

| | | | |
|---|---|---|---|
| 169,936 | 4/1906 | Germany | 175/394 |
| 258,329 | 4/1913 | Germany | 175/394 |

Primary Examiner—Z. R. Bilinsky
Attorney, Agent, or Firm—Walter Becker

[57] ABSTRACT

A drill for electronic conductor plates with a cylindrical drill head which is arranged at the front end of a shank, and which in particular has a working diameter of from 0.5 to 1.2 mm. The rear end of the cylindrical drill head is in the direction toward the drill shank followed by a first shank section of a shorter outer diameter. The drill head and the next following first shank section comprise guiding passages for the drilled out material, especially continuous helical grooves in the manner customary with spiral drills. The drill is characterized primarily in that the first shank section adjacent the drill head conically tapers from the rear end of the drill head in the direction toward the rear end of the drill shank.

4 Claims, 4 Drawing Figures

DRILL FOR ELECTRONIC CONDUCTOR PLATES

The present invention relates to a drill for electronic conductor plates with a cylindrical head provided at the front end of the shank, especially a drill head having a working diameter of from about 0.5 mm to 1.2 mm while the rear end of the drill head is continued as a shank section with a smaller outer diameter, the drill head and the adjacent shank section having at least one conductive passage for the drill material, especially in the manner of helical grooves of a spiral drill.

During the last years printed circuits have been used in electronics which circuits comprise as base body conductor plates. These conductor plates are, as a rule, copper-coated or copper-laminated epoxy resin plates which are reinforced by glass fibers and which are bored and etched in conformity with the respective circuit whereupon the bores are metallized. In this way the two copper layers each of which may have, for instance, a thickness of 0.035 mm are metallically conductively interconnected. Depending on the requirements, the bores have, as a rule, a diameter between 0.5 mm and 1.2 mm, and the condutor plates have a thickness of about 1.6 mm. Frequently, plate packets of, for instance, from two to four conductor plates arranged adjacent to each other are bored together in one operation. Due to the increasing miniaturizing in the electronic industry, so-called multi-layer conductor plates have been developed which may have a plurality, for instance ten or more, control planes and may have a thickness of from 3 mm to 6 mm.

Inasmuch as the described conductor plates are compound plates of three different materials, namely copper, epoxy resin and glass fiber, and inasmuch as the properties of these three materials are very different from each other, the drill has to meet considerable requirements. In particular the proportion of glass fibers in the compound material has a very wearing effect upon the drill. Therefore, full-hard-metal drills are employed, in other words, drills which throughout form one single piece of hard metal or a similar hard material.

Also requirements as to a high quality of the drill and as to the surface property of the walls of the drilled bores have to be met which bores have to be as smooth-walled as possible. If the walls of the drilled bores are rough or show tears, it will be appreciated that when such bores are metallized, difficulties will be encountered inasmuch as the thickness of the metal layer will greatly vary and may even partly be interrupted. Particularly high requirements have to be met with regard to the quality of the drilled bores when conductor plates for space flight or for sensitive measuring devices are involved, and when conductor plates are involved which are dynamically subjected to shocks or the like as is the case, for instance, with conductor plates for automobile radios. When the surface of the walls of drilled bores shows tears, notch stresses may occur in the metallized layer which in turn may result in breakage and in an interruption of the electric contact. Such defects can, for all practical purposes, not be ascertained and it is for this reason that damaged plates have to be exchanged.

When drilling bores of conductor plates by means of cylindrical drills, which in the cutter geometry correspond to the guiding phase and in their remaining design correspond to heretofore customary drills for metal, considералbe drawbacks are encountered. The guiding phase which extends over the entire useful length of the drill shank of the helix thereof will during the entire duraction of the drilling operation touch or graze bundles of the glass fibers which are in a crosswise manner embodded in the epoxy resin. These glass fiber bundles extend into the bore and during the drilling operation are cut at high circumferential speeds of from 50 to 250 m/min so that brushes are formed on which the drill slides and which are by the drilling operation subjected to a continuous vibration due to which the synthetic material therebetween in the wall of the bore is shaken loose and centrifuged out. As a result thereof the wall of the bore becomes rough.

Furthermore a high friction occurs as a result of which the drill frequently will break. In addition thereto, also a high heat development takes place due to which the drill becomes clogged up by molten and burned epoxy resin so that a further increase in the load on the drill as well as a decrease in the quality of the wall of the drilled bore will result. When drilling bores through conductor plates by means of drills which at the front end of the shank have a predetermined length and the rear end of which is followed by a likewise cylindrical shank section with a reduced outer diameter, the glass fibers are only over the relatively short length of the drill head and during the return of the drill from the bore subjected to vibrations. Due to the step-shaped reduction in the diameter, the glass fibers are, however, during the advance of the drill suddenly freed and during the return stroke of the drill are as suddenly again subjected to vibrations or oscillations in connection with which the glass fibers are subjected to pull stresses. This is due to the fact that the glass fibers during the return or withdrawal of the drill push against the rear shoulder-shaped step of the drill head.

When the conductor plates are drilled by a conical drill which tapers from the drill tip uniformly toward the rear, a post-grinding or post-sharpening of such drill at the drill tip brings about the drawback that the working diameter of the drill will decrease which is not admissible in view of the required precision of the diameter of the bore to be drilled.

It is, therefore, an object of the present invention to provide a drill for electronic conductor plates which, on one hand, will permit a repeated post-sharpening without altering the diameter of the drill or the bore to be drilled and, on the other hand, will assure a high quality of the wall of the bore.

This object and other objects and advantages of the invention will appear more clearly from the following specification in connection with the accompanying drawings, in which.

The drill according to the present invention for electronic conductor plates is characterized primarily in that the shank section adjacent the drill head tapers from the rear end of the drill head toward the rear in an approximately conical manner. As a result thereof, in spite of a reduction in the shank section adjacent the drill head, no steps between this shank section and the drill head are necessary at all so that during the return stroke of the drill the glass fiber brushes projecting into the wall of the bore will not be subjected to vibrations and will also not be subjected to any pull stresses. This is true in particular when the outer surfaces of the shank section adjacent the drill head merge at least approximately tangentially with the drill head. Due to the consequently very slight and step-free reduction in the diameter, also a proper drilling course will be realized during the advance stroke.

Figure 4:
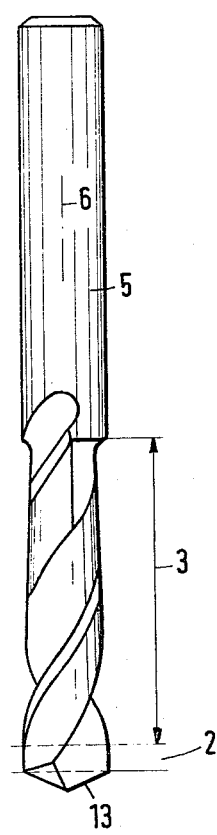
FIG. 4 is a drill according to the invention as shown in FIG. 1 in which the area merging the drill with the shank is not conical.
Figure 1:
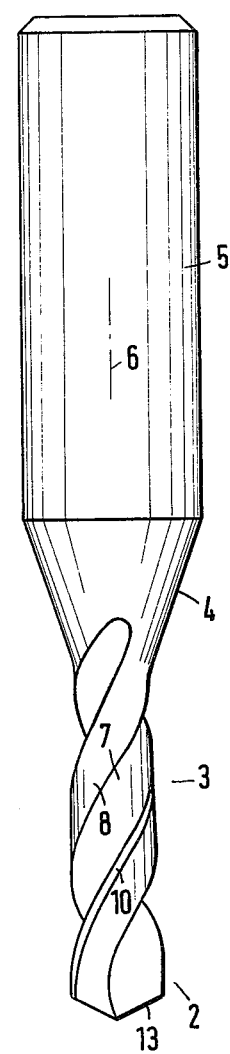
FIG. 1 illustrates a view of a drill according to the invention.
Figure 3:
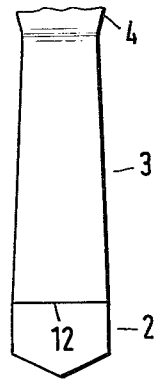
FIG. 3 shows a view of the front shank part of the drill of FIG. 1 but without the helical grooves.
Figure 2:
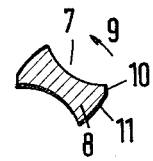
FIG. 2 represents a section through the front end of the drill of FIG. 1.

Referring now to the drawings in detail, the drill for electronic conductor plates as illustrated in FIGS. 1 to 4 has a shank 1 made in one piece with full cross section of hard metal or the like. The front end of shank 1 is equipped with a drill head 2 which is confined by a cylindrical enveloping surface and furthermore comprises a first shank section 3 which when looking in the direction toward shank 1 follows said drill head 2 and is in its turn followed by a outwardly flaring second shank section 4 which in its turn is followed by a cylindrical holding shank 5 for chucking the drill in a drilling machine or the like. The drill head 2 and the first shank section 3 which latter tapers in the direction toward the shank 1 are in the manner of a spiral drill provided with two helical grooves 7 which cross-sectionwise are located diametrically opposite to each other. The helical grooves 7 have relative to the axis 6 of the drill a pitch of approximately 30°. The helical grooves 7 which in conformity with FIG. 2 are over their entire width rounded out approximately concavely extend without interruptions over the drill head 2 and the tapered section 3 and in order to provide for a satisfactory withdrawal of the bore dust or bore meal extend also with a relatively long drilling depth over the entire length of the tapered first shank section 3, in other words up to the front end of the outwardly flaring shank section 4. The helical grooves 7 are on both sides confined by helical sections 8 which on the circumference of the drill in cross section according to FIG. 2 have a width which is reduced over the width of the helical grooves 7. At the front edge of helix 8, when looking in the direction of the arrow 9 in-dicating the drilling rotation of the drill, there is provided a guiding chamfer or bevel 10 which is located in the pertaining eveloping surface of the drill head 2 or the tapering first shank section 3. The chamfer or bevel 10 is in cross section according to FIG. 2 located approximately at the right angle to the adjacent sharp angled section of the confining surface of the pertaining helical groove 7. In a direction opposite to the direction in which arrow 9 points, the guiding bevel or chamfer 10 is followed by an outer surface 11 which is convexly curved in cross section and which in the direction opposite to the direction of rotation in working direction reduces its distance from the axis 6 of the drill.

The sections of the guiding bevel or chamfer 10 which are located on the drill head are, at least within the region of those edges thereof which when looking in the drilling direction (arrow 9), form the front edges, arranged in a cylindrical eveloping surface about the axis 6 of the drill. The diameter of said enveloping surface equals the working or rated diameter of the drill. Over the length of the drill head 2, also the zones of the outer surfaces 11 are spaced by constant distances from the axis 6 of the drill, said zones of the outer surfaces 11 respectively having the same distance from the guiding bevel or chamfer 10.

Adjacent the rear end 12 of the drill head 2 there is provided the tapering first shank section 3 having an outer diameter which equals that of the drill head 2 so that the helices 8 practically without any step merge from the drill head 2 with the tapering first shank section 3. The shank section 3 is, however, toward the rear uniformly conically tapering while a cone angle of only about one degree is provided so that the helices 8 from the drill head 2 will also practically without any edge merge with the first shank section 3. Due to the above outlined design, the guiding bevels or chamfers are within the region of the tapering first shank section 3 at least with regard to their front edges (viewed in the direction of the arrow 9, i.e., direction of rotation during the working operation) located in an enveloping surface which tapers at an acute angle toward the rear and the conical angle of which amounts to only one degree. The distances of the outer surfaces 11 of spiral 8 from said enveloping surface may within the region of the tapering first shank section 3 be constant over the length thereof or may decrease toward the rear at a maximum to such an extent that their distances from the drill axis 6 over the length of the first shank section 3 are constant. In particular in the last mentioned instance, the width of the guiding bevels or chamfers 10 may decrease from the rear end 12 of the drill head 2 toward the rear while the guiding bevels or chamfers 10 may in spaced relationship to the rear end of the decreasing first shank section 3 end in a pointed manner or may gradually merge with the outer surfaces 11. The tapering or decreasing first shank section 3 extends similar to the pertaining helices 8 and guiding bevels or chamfers 10 over a length which over the diameter of the drill head 2 is greater by a multiple, for instance is three times as great. The length of the drill head 2 which is smaller than said last mentioned length of said tapering first shank section 3 corresponds only from about half to twice its outer diameter. The cutting edges 13 of the drill provided at the front end of the drill head 2 may with regard to each other define an angle which opens toward the rear and amounts to about 125°. The said cutting edges 13 may be located in a common axial plane of the drill. Expediently, the guiding bevels or chamfers 10 have within the region of the drill head 2, for instance due to lapping, an extremely slight roughness, whereas the roughness within the region of the tapered first shank section 3 may be greater so that they can be produced by mere roughing.

At the rear end of the tapered shank section 3 which has the shortest outer diameter said first shank section 3 merges with the widening second shank section 4 along a rounded portion, said second shank section 4 being designed as an acute angular truncated coneshaped part with a conical angle of for instance 40° which is greater than the first shank section 3. The second shank section 4 which is shorter than the first shank section 3 has a length which is shorter than its greatest diameter and with its rear end that has the greatest diameter merges directly with a cylindrical holding shank 5 having the same outer diameter while the length of said shank 5 corresponds about to half the total length of the drill. The helical grooves 7 the confining surfaces of which over their entire length about equally spaced from the axis 6 of the drill or may get closer toward the rear to the axis 6 of the drill in conformity with the conicity of the tapering first shank section 3, end in the front end of the widening or flaring shank section 4 along a rounded area.

It is, of course, to be understood that the present invention is, by no means, limited to the specific showing in the drawing but also comprises any modifications within the scope of the appendec claims.

What I claim is:

1. An axially extending drill for printed circuit boards, which includes a holding shank on one end, a cylindrical drill head at the opposite end, and a first conical shank section connected to said drill head and conically tapering uniformly toward the drill axis from the diameter of said cylindrical drill head over a length substantially greater than the length of said cylindrical drill head of a smaller diameter of said conical shank section, and a second conical shank outwardly flaring from said drill axis and joining said conical section and the larger diameter holding shank, said cylindrical drill head and said conical shank section having helical flutes which extend continuously along the said cylindrical drill head and said conical shank section and are spaced by smooth surfaces having the diameter of said drill at any point and provided with cutting edges on their ends.

2. A drill as claimed in claim 1, said drill having rearward beveled surface adjacent the cutting edges extending from the forward edges of said flutes in the direction of rotation and located in the enveloping surface of rotation of said cylindrical drill head and conical shank section.

3. A drill according to claim 1, in which said first conical shank section tapers along a cone angle of about 1°.

4. A drill according to claim 1, in which said first conical shank section tapers down over a length at least three times the length of said cylindrical drill head.

* * * * *